United States Patent [19]

Friesen et al.

[11] 4,347,031
[45] Aug. 31, 1982

[54] PARKING STAND FOR TRACTOR-DISMOUNTED FRONT LOADER

[75] Inventors: Henry Friesen, Niagara Falls; Mervin P. Kizlyk, Welland, both of Canada

[73] Assignee: Deere & Company, Moline, Ill.

[21] Appl. No.: 161,841

[22] Filed: Jun. 23, 1980

[51] Int. Cl.³ .............................................. E02F 3/74
[52] U.S. Cl. ................................... 414/686; 172/274; 212/189
[58] Field of Search ............... 212/189; 280/763, 765; 414/686; 172/274

[56] References Cited

U.S. PATENT DOCUMENTS

| | | | |
|---|---|---|---|
| 2,833,432 | 5/1958 | Foster | 414/686 X |
| 3,454,251 | 7/1969 | Dye | 280/765 X |
| 4,247,242 | 1/1981 | Goertzen | 414/686 |
| 4,257,730 | 3/1981 | Kawakita | 414/686 |
| 4,275,984 | 6/1981 | Lenertz | 414/686 |

Primary Examiner—David A. Scherbel
Attorney, Agent, or Firm—Henderson & Sturm

[57] ABSTRACT

A parking stand of telescopic character that may be selectively lengthened and shortened between the ground and an elevated portion of a dismounted implement, such as a front end loader, and lockable in either condition, in the lengthened condition serving as a supporting strut for the implement and in the shortened and locked condition occupying a retracted or transport position. The shortened members are swingable toward the implement and locked thereto by the same means that locks the members in their shortened condition. The members are of channel shape and nest one within the other and are conditioned for relative lengthwise sliding by lugs means on the outer channel that extend partly across the inner channel and engage the flanges of the inner channel.

1 Claim, 6 Drawing Figures

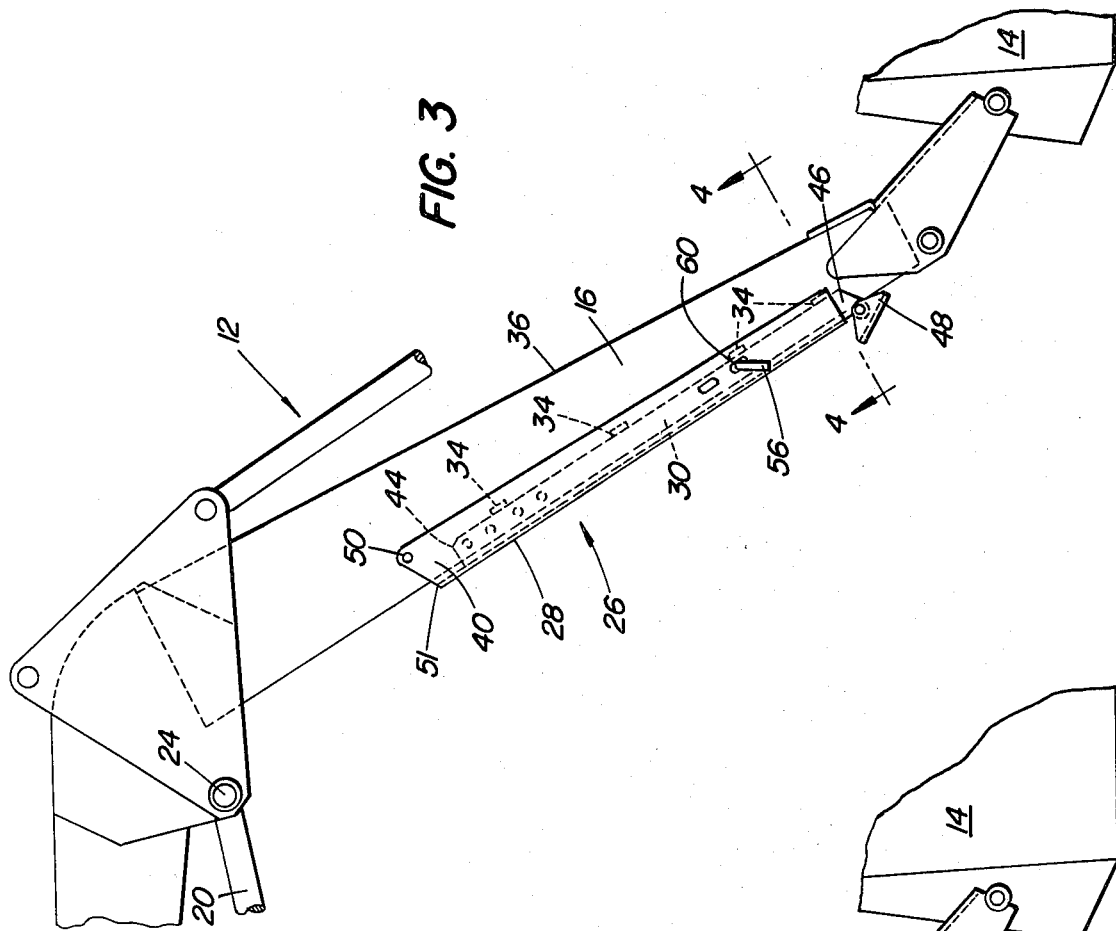

PARKING STAND FOR TRACTOR-DISMOUNTED FRONT LOADER

SUMMARY OF THE INVENTION

The typical tractormounted front loader has a forward bucket from which a pair of lift arms extend upwardly and rearwardly to transversely coaxial pivots with the tractor, and these arms, and the bucket, are raised and lowered by power means, usually of the hydraulic type. The loader as a unit can be detached or dismounted from the tractor by releasing the pivot means and removing the hydraulic means and further by supporting the lift arms from the ground in rearwardly spaced relation to the ground-engaging bucket. Such support means are commonly known as parking stands and a large variety of such stands is known in the prior art. Chief defects in the prior art stands are difficulty in storing the stand with the loader so that it is always available, likely loss of parts, non-portability and complicated design.

The present invention features a simple design in which two relatively longitudinally slidable parts are interfitted so as to afford a stand that may be selectively shortened and lengthened for transport or park positions respectively. The upper member is pivoted to an elevated portion of the lift arm so that the shortened members may be swung forwardly toward the rear, uphill portion of the lift arm and locked there in substantial parallelism with that portion. Further, the members are of channel cross-section and so dimensioned as to nest with that portion. Additionally, the means for locking the members in either lengthened or shortened position is also used to lock the shortened members to the lift arm in transport position. Since this same lock means must be used at all times, it cannot become lost or misplaced. The members are long enough so that they cannot become separated and hence neither can be lost. The stored or transport position in close relationship to the lift arm eliminates problems of clearance with the tractor front wheels when the loader is mounted on the tractor.

BRIEF DESCRIPTION OF THE DRAWINGS

FIG. 2 is an enlarged fragmentary view of a lift arm portion and associated parking stand in its supporting or park position.

FIG. 3 is a similar view but shows the stand retracted to storage or transport position.

DESCRIPTION OF THE PREFERRED EMBODIMENT

Figure 1:
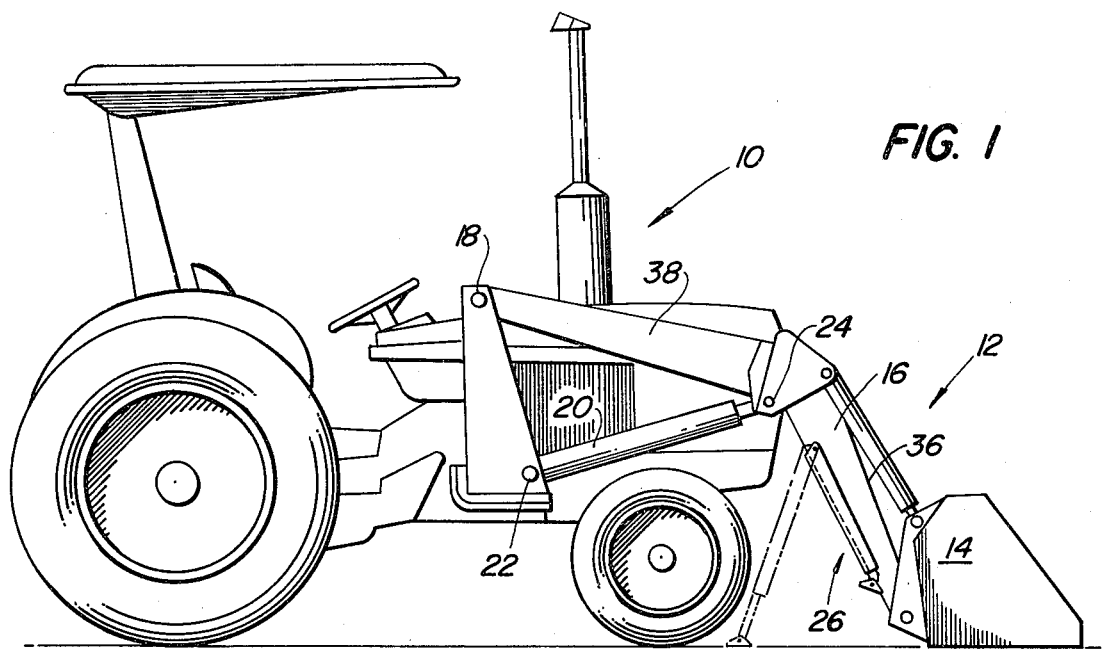
FIG. 1 is a schematic side view of a typical tractor-mounted front loader.

As seen in FIG. 1, a typical farm or like tractor 10 carries a front-mounted loader 12 having a bucket 14 from which a pair of lift arms 16 (only one being shown) extend upwardly and rearwardly to the tractor, at which point each arm is pivoted to the tractor (or part thereof) at 18 by any suitable disconnectible means not important here. Each lift arm is raised and lowered by hydraulic means 20 connected between the lift arm and tractor as at 22 and 24, these also being disconnectible by any well-known means.

Figure 6:
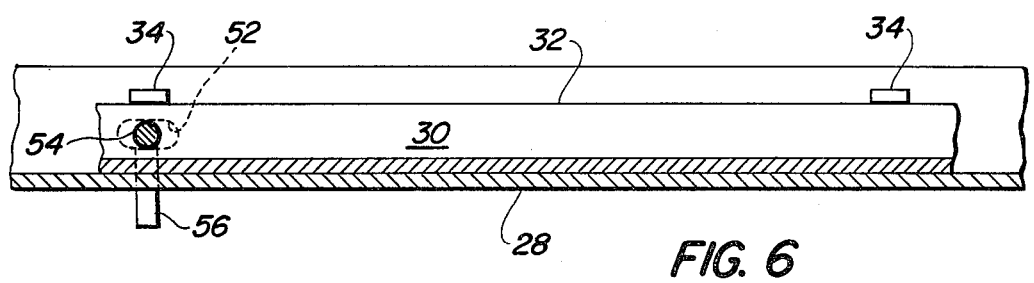
FIG. 6 is a section on the line 6—6 of FIG. 5.

Parking stand means according to the present invention is indicated in its entirety at 26, being shown in transport position in full lines and in dotted lines in support or park position in FIG. 1. This means comprises first and second members 28 and 30 respectively, each being of channel cross-section with the dimensions of the first member exceeding those of the second member so that the latter fits lengthwise slidably within the former and so that the flanges of the second member are of lesser height than those of the first member, whereby the second member flange edges, as at 32 in FIG. 6, are below the edges of the first member flanges. In the area represented by the excess height of the first member flanges over that of the second member, the first member carries, on each flange, a series of longitudinally spaced inward projections or lugs 34 which respectively overlie the second member flange edges so as to confine relative movement of the two members to lengthwise only, whereby the members cannot come apart except by sliding them far enough apart to accomplish this. The lugs are disposed substantially throughout the length of the members so as to maintain confinement throughout a maximum range short of complete separation.

The lift arm 16, as is fairly typical of loader designs, has a bucket-connected forward portion 36 that slopes uphill and to the rear and then extends rearwardly substantially horizontally as an elevated portion 38. The first or upper member of the support stand 26 has upper and lower ends 40 and 42 respectively, and the lower member 30 has upper and lower ends 44 and 46 respectively. The lower member extends outwardly through the upper member lower end and is fitted at its lower end with a ground-engaging shoe 48. The top end 40 of the upper member has a pivotal connection 50 with the lift arm 16 at an upper part of the lift arm uphill portion 36 in the vicinity of the lift arm elevated portion 38, and it is about this pivot that the stand means 26 can be swung between its park position (FIG. 2) to its storage or transport position (FIG. 3).

Figure 4:
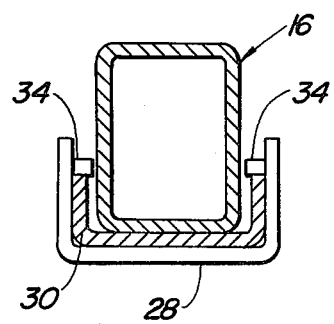
FIG. 4 is a section on the line 4—4 of FIG. 3.
Figure 5:
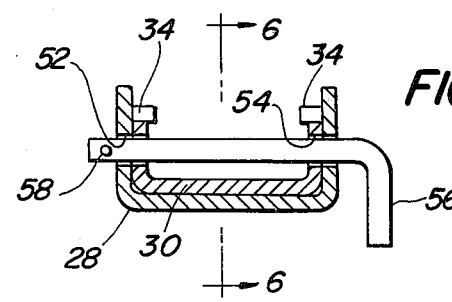
FIG. 5 is a section on the line 5—5 of FIG. 2.

When the stand means is in its park position, the members 28 and 30 are extended sufficiently to enable the shoe 48 to rest on the ground and the composite stand then occupies the status of a strut between the ground and the elevated lift arm. In this position the upper surface 51 of the upper member abuts against the rearward surface of the uphill portion 36 to prevent further swinging movement about the pivotal connection 50. A member 28 is provided with a pair of openings in the form of short slots 52, transversely aligned across the member flanges, and the other member 30 has its opposite flanges formed with a plurality of holes 54. Lock means in the form of a L-shaped lock pin 56 is passed through a set of aligned slots and holes to retain the members in lengthened or extended position, and any type of retainer or cotter 58 may be used to prevent escape of the pin (FIG. 5). The uphill portion of the lift arm has an opening 60 for receiving the lock pin 56 when the members are shortened and swung forwardly for transport (FIG. 3). Thus the same pin serves not only to hold the members in shortened position but also to lock the shortened members to the lift arm, in this status using the lowermost hole 54 (FIG. 2) in the lower member 30. As best seen in FIG. 4, the channel members are so arranged and dimensioned as to receive and nest with the lift arm, placing the stored stand in close proximity to the lift arm and eliminating any problems of clearance with the front wheels of the tractor during operation of the tractor-loader unit.

The construction is simple and may be inexpensively manufactured. Its design is such that it may be installed on existing loaders. Various other features will occur to those versed in the art, as will many modifications in the preferred embodiment disclosed.

We claim:

1. In an implement parking stand having an elongated upper member pivoted at its upper end to the implement for swinging toward and away from the implement respectively between transport and park positions, a lower member slidingly interfitting with the upper member and swingable therewith between transport and park positions, and releasable lock means selectively engageable and disengageable between the members for selecting lengthened or shortened conditions thereof, the improvement residing in that the members are of channel cross section so dimensioned that one fits within the other with the open sides of the channels facing in the same direction, the side flanges of the outer of the members being of greater height than those of the inner member, the flanges of the outer member in the areas thereof of greater height having rigid thereon a plurality of lugs spaced lengthwise thereof and extending partly across the inner member sufficiently to overlie the inner member flanges and thus to confine the inner member between the lugs and the bottom of the outer member and said lock means being so constructed as to serve, in the shortened condition of the members, to lock the members to the implement in transport position.

* * * * *